US006280269B1

(12) United States Patent
Gaynor

(10) Patent No.: US 6,280,269 B1
(45) Date of Patent: Aug. 28, 2001

(54) OPERATOR DISPLAY PANEL CONTROL BY THROTTLE MECHANISM SWITCH MANIPULATION

(75) Inventor: Phillip K. Gaynor, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/516,880

(22) Filed: Mar. 1, 2000

(51) Int. Cl.[7] .................................................. B60K 41/00

(52) U.S. Cl. .............................................. 440/84; 440/86

(58) Field of Search .............................. 440/1, 2, 84, 85, 440/86, 87; 114/144 R

(56) References Cited

U.S. PATENT DOCUMENTS

| | | | | |
|---|---|---|---|---|
| 4,027,555 | | 6/1977 | Rauchle et al. | 74/878 |
| 4,119,186 | | 10/1978 | Choudhury et al. | 192/96 |
| 4,253,349 | | 3/1981 | Floeter et al. | 74/878 |
| 4,794,820 | | 1/1989 | Floeter | 74/878 |
| 4,801,282 | * | 1/1989 | Ogawa et al. | 440/84 |
| 4,836,809 | * | 6/1989 | Pelligrino | 440/84 |
| 5,094,122 | | 3/1992 | Okita | 74/480 |
| 5,318,466 | | 6/1994 | Nagafusa | 440/86 |
| 5,492,493 | | 2/1996 | Ohkota | 440/86 |
| 5,637,022 | | 6/1997 | Koike et al. | 440/87 |
| 5,941,188 | * | 8/1999 | Takashima | 440/84 |
| 5,967,867 | * | 10/1999 | Rinzaki et al. | 440/84 |
| 6,142,841 | | 11/2000 | Alexander et al. | 440/38 |

* cited by examiner

*Primary Examiner*—Stephen Avila
(74) *Attorney, Agent, or Firm*—William D. Lanyi

(57) ABSTRACT

A throttle control mechanism is provided with a plurality of buttons and a control unit that interprets the state of the various buttons and switches in different ways, depending on the state of a first operating parameter. The first operating parameter can be the gear selector position or the status of a manual selector switch or push button. Based on the state of the first operating parameter, at least one switch is interpreted to represent a first command based on a first state of the first operating parameter and a second command based on the second state of the first operating parameter. This allows dual functionality for the buttons and switches which reduces the required number of switches and also allows the important control switches to be placed easily within reach of the operator of a marine vessel.

9 Claims, 4 Drawing Sheets

OPERATOR DISPLAY PANEL CONTROL BY THROTTLE MECHANISM SWITCH MANIPULATION

BACKGROUND OF THE INVENTION

1. Field of the Invention

The present invention is generally related to the control of an operator's display, or LCD panel and, more specifically, to the use of dual function buttons or switches on a throttle control mechanism to allow an operator to select display characteristics by manipulating buttons or switches attached to the throttle control mechanism.

2. Description of the Prior Art

Many different types of remote control throttle mechanisms are known to those skilled in the art. U.S. Pat. No. 4,027,555, which issued to Rauchle et al on Jun. 7, 1977, discloses an engine transmission and speed control with a warm up interlock apparatus. A single lever manual control for marine propulsion units includes a shift gear train and a throttle gear train mounted in side-by-side coaxial relation on a rotating input shaft with the trains terminating in shift lever and throttle lever outputs respectively. Push-pull cable units couple the levers to the engine. The throttle cable has an outer sleeve pivotally mounted by a pivot arm with a pivot axis adjacent the outer wall of the control housing. A key extends through the input shaft into a shift gear having a direct drive notch and an adjacent circumferentially enlarged warm up notch. A warm up button is connected to a rod which engages one edge of the key. A spring loaded pin within the shaft engages the opposite key face to resiliently establish the direct drive connection. The button is depressed and forces the rod and key into the warm up notch and the pin into an opening into a shift lever to prevent rotation thereof. The opening and pin are only aligned in neutral. A neutral start switch and a reverse lock solenoid switch are mounted adjacent a cam on a gear on the throttle gear train. Trim control switches in the lever are connected to a tubular connector unit within the shaft and have output leads wound about the shaft.

U.S. Pat. No. 4,119,186, which issued to Choudhury et al on Oct. 10, 1978, describes a single lever control having a throttle warm up lever. The single lever control for the throttle and clutch of a marine propulsion device includes a housing pivotally supporting both a main control lever and an auxiliary warm up lever, a throttle lever, and a gear shift lever. The throttle lever is alternately operable to regulate the setting of a remotely located engine throttle in response to movement of either the main control lever from a neutral position or the warm up lever from an idle position. The gear shift lever is operable to shift an engine clutch in response to initial movement of the main control lever from the neutral position. A lock out lever mounted inside the housing cooperates with a lock out plate carried by the warm up lever and with a recessed, arcuate surface on the gear shift lever to prevent movement of the warm up lever when the main control lever is displaced from the neutral position and to prevent movement of the main control lever when the warm up lever is displaced from the idle position.

U.S. Pat. No. 4,253,349, which issued to Floeter et al on Mar. 3, 1981, discloses a control unit for marine engines which employ a neutral lock mechanism. A control unit for an engine of the type having a shift means for shifting between forward, neutral, and reverse and a throttle means for controlling engine speeds between idle and high speed includes a housing and a control handle rotatably supported at one end by the housing. Shift and throttle cables extend between the engine and the housing, and respond to rotation of the handle to control the engine shifting and throttle during portions of the period of rotation of the handle. A lock rod extends through the handle and is adapted at one end to alternatively engage and disengage with the housing, and when engaged with the housing, prevents the rotation of the handle from a position corresponding to neutral and idle throttle.

U.S. Pat. No. 4,794,820, which issued to Floeter on Jan. 3, 1989, discloses a marine drive twin lever remote control with an interlock override. A twin lever control actuator operates push-pull cables and has two sets of pulleys on opposite sides of a control body. Interlock structure normally prevents movement of the shift lever and its cable when the throttle lever and its cable are in a high speed position and with operator applying normal force to the shift lever. Override structure permits movement of the shift lever and its cable with the throttle lever in a high speed position when the operator applies an abnormally high force to the shift lever, to enable emergency high speed shifting including from forward to reverse, to facilitate rapid deceleration.

U.S. Pat. No. 5,094,122, which issued to Okita on Mar. 10, 1992, describes a remote control system. The remote control system is provided for transmitting control movement to a controlled member, such as a throttle or transmission control lever, on a marine propulsion unit from a preselected one of a plurality of remote control units each of which has an operator movable between a plurality of positions. A remote control mechanism has at least one slidably supported control element operatively connected to each of the operators for linear reciprocation of the control elements upon movement of the respective operator.

U.S. Pat. No. 5,318,466, which issued to Nagafusa on Jun. 7, 1994, describes a remote control device for marine propulsion units. A remote control device incorporates a remote control lever for the shifting and throttle operations of a marine propulsion unit. A shift range exists in the central region of lever movement where only shift operations can take place, and once the remote control lever has passed through the above mentioned specific movement range, it is in a throttle range wherein its movement can control only the throttle. The remote control device includes a throttle drive control arrangement which opens and closes the throttle valve in relation to the operation of the above mentioned remote control lever in a manner which depends upon an operator selected operational mode made via a mode select switch.

U.S. Pat. No. 5,492,493, which issued to Ohkita on Feb. 20, 1996, describes a remote control device for a marine propulsion unit. The remote control operator for a marine propulsion transmission and throttle control that is operated by a single control lever is disclosed. The single control lever's position is sensed and a single servomotor is operated which operates both the transmission control and the throttle control through a cam and follower mechanism. A warm up control is also incorporated that permits partial opening of the throttle for warm up operation.

U.S. Pat. No. 5,637,022, which issued to Koike et al on Jun. 10, 1997, describes a switch apparatus for a marine propulsion unit. A control switch assembly for utilization with marine propulsion units to be mounted in, for example, the single lever housing of the transmission and throttle control is disclosed. The switch assembly includes a sealed outer housing providing at least two cavities for containing switches and a hard wire interconnection to an external terminal for connection to a wire harness.

The patents described above are hereby explicitly incorporated by reference in the description of the present invention.

The control mechanisms for a marine vessel, such as a pleasure boat, have become technically sophisticated in recent years. The operator of a marine vessel is now provided with various types of visual displays, such as liquid crystal displays (LCD's), which provide vessel-related information to the operator. These displays are often provided with many optional formats and screens, which can be selected by the operator, and which show various parameter statuses relating to devices used on the marine vessel. Therefore, in addition to the standard controls, such as throttle control and shift control, the marine vessel operator now uses additional switches, pushbuttons, and actuators to select the desired visual display on the liquid crystal display module. It would therefore be significantly beneficial if a convenient structure could be provided in which fewer control switches are required and in which the marine vessel operator had easy and quick access to the display controls without having to remove the operator's hand from the shift and speed control mechanism.

SUMMARY OF THE INVENTION

A throttle control mechanism for a marine vessel made in accordance with the present invention, comprises a base portion that is attached to the marine vessel. Typically, the base portion is attached to a portion of the hull at the helm and within reach of the operator when the operator is seated at the helm and in the process of steering the marine vessel. A first manually movable lever is movably attached to the base portion for movement relative to the base portion. Typically, the first manually movably lever pivots about a rotational axis at its attachment point to the base portion, but in some applications it can slide linearly. Moving the lever in one direction typically selects a forward speed while moving the lever in the opposite direction typically selects a reverse speed. A central position of the lever, with respect to the base portion, typically selects a neutral gear position with a relatively low speed selection. A control unit is connected in signal communication with a throttle control mechanism and is connected in signal communication with a first sensor that provides a first signal to the control unit which is representative of a first operating parameter of the marine vessel being in either a first state or second state. For example, the first sensor can be a sensor that determines the gear position selection of the first manually movable lever or of the engine itself. In other words, the first sensor can provide a signal that is representative of a first operating parameter, which could be the gear selection position. The first state and second state of this first particular operating parameter could be the gear selector being in gear or in neutral, respectively. Alternatively, the first sensor can be a switch that provides a first signal which is representative of a first operating parameter which is the status of a push button selected by the operator. The first state and second state, respectively, would be an activated push button and a deactivated push button.

At least one switch is attached to the throttle control mechanism and connected in signal communication with the control unit. The status of the switch is interpreted as a first command when the first operating parameter is at a first state and is interpreted as a second command when the first operating parameter is in the second state. For example, a switch on the throttle control mechanism can be interpreted as a shift enable command when the gear selector is in a neutral position and can be interpreted as a digital engine speed control button when the gear selector is in either forward or reverse position.

The present invention can further comprise a second sensor which provides a second signal to the control unit which is representative of a second operating parameter of the marine vessel being in a third state or fourth state. For example, while the first sensor might sense the position of a gear selector, the second sensor could sense the status of a manual selection push button. In this example, the third state would be an activated push button and the fourth would be a deactivated push button while the first and second states of the first sensor would be in neutral gear position or in gear, either forward or reverse.

The present invention allows control devices mounted on the throttle control mechanism to be used for dual purposes. This dual use of push buttons and manually controlled switches not only reduces the total number of switches needed in a relatively limited space but, in addition, allows the location of visual display control buttons to be located conveniently on the throttle control mechanism within easy reach of the vessel operator.

BRIEF DESCRIPTION OF THE DRAWINGS

The present invention will be more fully and clearly understood from a reading of the description of the preferred embodiment, in conjunction with the drawings, in which.

DESCRIPTION OF THE PREFERRED EMBODIMENT

Figure 1:
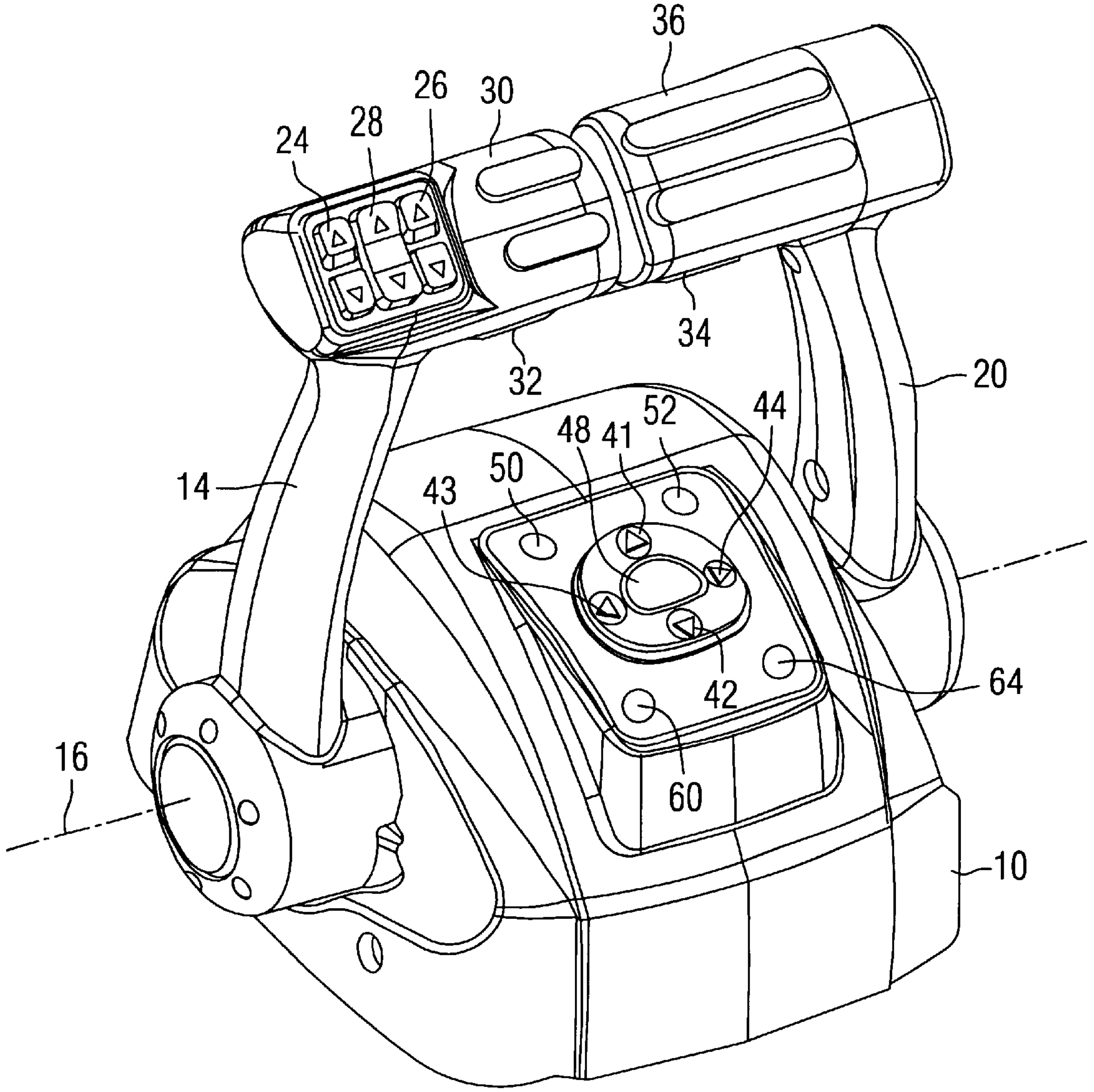
FIG. 1 is a perspective view of a throttle control mechanism made in accordance with the present invention.

Throughout the description of the preferred embodiment of the present invention, like components will be identified by like reference numerals.

FIG. 1 shows a throttle control mechanism for a marine vessel which is made in accordance with the present invention. A base portion 10 is typically attached to the deck of a marine vessel proximate the location in which the operator of the marine vessel sits when at the helm. A first manually movable lever 14 is movably attached to the base portion 10 for movement relative to the base portion. The first manually movable lever 14 is attached for partial rotation about axis 16. Movement of the first manually movable lever 14 forward, about axis 16, causes the associated marine propulsion device to be first moved into forward gear, from neutral, and then causes the engine speed to be increased as the first manually movable lever 14 is moved further in a forward direction. A second manually movable lever 20 is attached to the other side of the base portion 10 for movement about axis 16. When two manually movable levers, such as 14 and 20, are provided as part of a throttle control mechanism, each lever typically controls an individual propulsion unit, such as an outboard motor or a stern drive system.

With continued reference to FIG. 1, a plurality of rocker switches, 24, 26, and 28, are provided on the first manually movable lever 14. A port switch 24 allows the operator to change the trim of the port marine propulsion drive and a starboard switch 26 allows the operator to change the trim of the starboard marine drive. The center switch 28 allows the marine operator to change the trim of both drives simultaneously. Each of the two manually movable levers has a neutral lock out switch in its handle. On the underside of the handle 30 of the first manually movable lever 14, a neutral lock out switch 32 is provided to allow the operator to move the handle 30 out of the neutral gear selection position. Similarly, the underside of handle 36 of the second manually movable lever 20 is provided with a second neutral lock out switch 34 to allow the second lever 20 to be moved out of its neutral gear selection position. These neutral lock out switches, 32 and 34, are also sometimes referred to as shift enable switches by those skilled in the art.

The base portion 10 of the throttle control mechanism is also provided with four directional buttons 41–44 arranged around a manual select button 48. As will be described in greater detail below, these four directional buttons are used for more than one purpose. In the center location relative to the four directional buttons 41–44, a manual select button 48 allows the operator to select several modes of operation, as will be described in greater detail below. One neutral LED 50 indicates to the operator when the first manually movable lever 14 is in neutral position. Similarly, another LED 52 indicates the operator when the second manually movable lever 20 is in the neutral position. When more than one helm is provided on a marine vessel, an active station LED 60 informs the operator which throttle control mechanism is considered to be the active mechanism by the vessel control system. Another LED, identified by reference numeral 64, is used to inform the operator of the mode in which the direction buttons 41–44 are activated. As will be described below, several of the buttons described above are provided with dual purposes in order to reduce the total number of switches required on the throttle control mechanism and, in addition, to allow easy access to the buttons by the operator for the purpose of controlling the operation of an operator display panel, such as a liquid crystal display (LCD).

Figure 2:
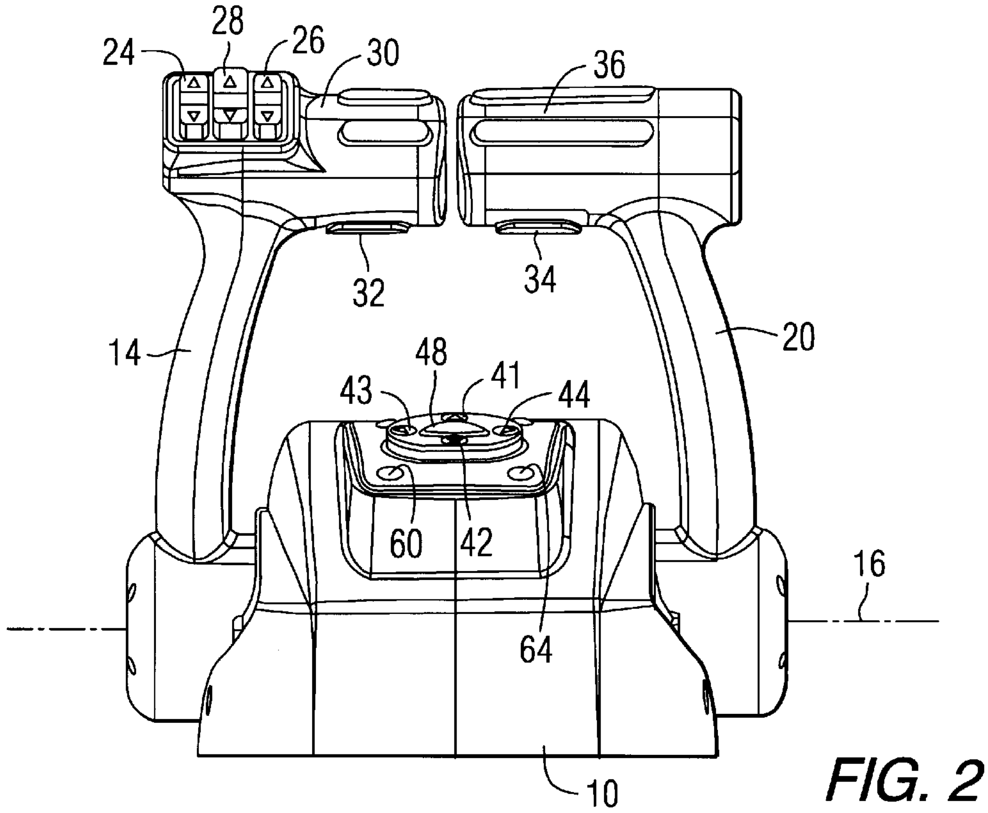
FIGS. 2 and 3 are front and side views of the mechanism shown in FIG. 1.

FIG. 2 shows a front view of the throttle control mechanism described above. In FIG. 2, the neutral lock out switches, 32 and 34, or shift enable switches, are more clearly visible. The two levers, 14 and 18, are rotatable about axis 16. As is known to those skilled in the art, rotation of either of the handles out of its central position first causes the gears of the associated marine propulsion drive to be moved into either forward gear or reverse gear, depending on the direction of movement of the lever. Continued movement of the lever then begins to increase the operating speed of the associated engine.

Figure 3:
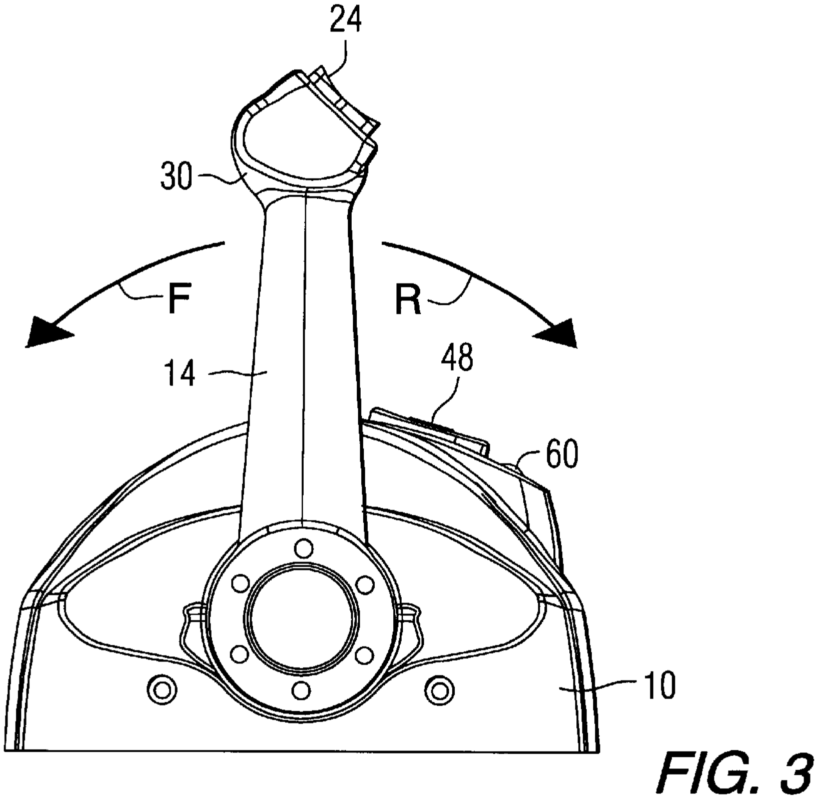

FIG. 3 shows a side view of the throttle control mechanism with the first manually movable member 14 being rotatable relative to the base portion 10. Rotation of the lever 14 in the direction identified by arrow F causes the gears of the associated marine drive to be first placed in forward gear position followed by an increase in engine speed as the lever 14 is further moved in a counterclockwise direction in FIG. 3. If the lever 14 is moved in the direction represented by arrow R, the gears are first changed from neutral position to reverse gear position and then the engine speed is increased.

Figure 4:
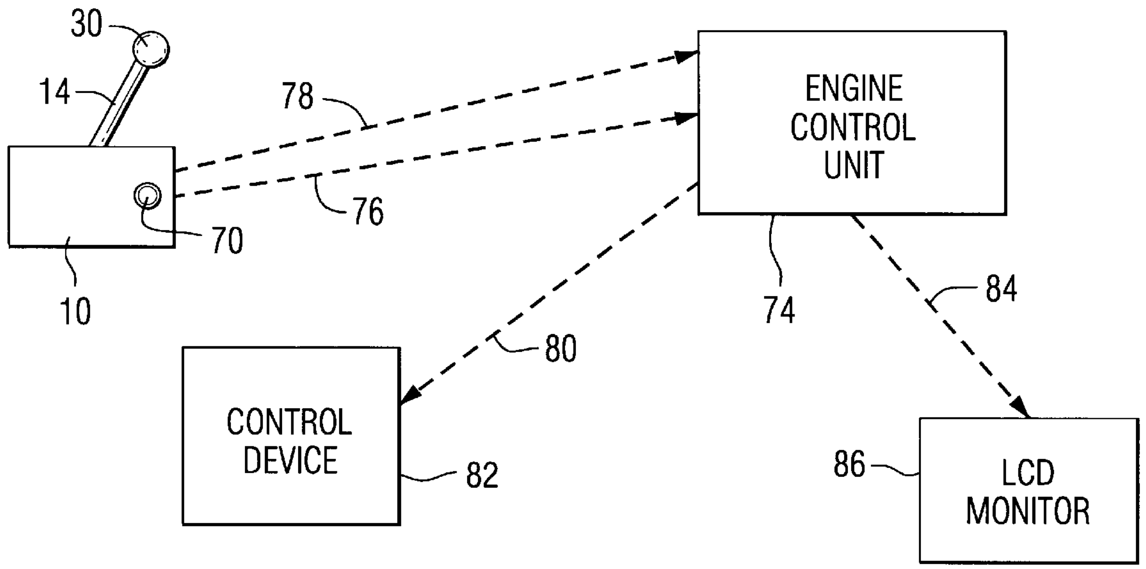
FIG. 4 is a simplified schematic showing how an engine control unit interprets signals from the throttle control mechanism to select various commands to be executed.

FIG. 4 is a highly schematic representation of the basic arrangement and operation of the present invention. The throttle control mechanism is illustrated with its base portion 10, its lever 14, and a handle 30. For purposes of this description, an exemplary button 70 is shown. The engine control unit 74 receives signals from the throttle control mechanism, one of which indicates the status of the button 70. The status of the push button 70 is provided to the engine control unit 74, as represented by dashed line 76. Another parameter, such as the status of the gear selector, is transmitted to the engine control unit 74, as represented by dashed line 78. As an example, the signal on line 78 could represent a simple binary status, relating to whether the lever 14 is in neutral or in gear. This signal could also emanate directly from the marine propulsion system. The signal on line 76 could also be a binary signal representing whether or not push button 70 is activated or deactivated. Based on the combination of the signals received on lines 76 and 78 the microprocessor of the engine control unit can make either one of two alternative decisions. For example, if the switch associated with push button 70 is the neutral lock out switch or shift enable switch 32, described above in conjunction with FIGS. 1 and 2, and the lever 14 is in neutral position, an activated status on line 76 would be interpreted by the engine control unit 74 as being a shift enable command that would allow the operator to move the lever 14 out of neutral position and into gear. If, however, lever 14 is already in forward gear or reverse gear, an activated status on line 76 would be interpreted by the engine control unit 74 as a request for an incremental digital increase in engine RPM.

Alternatively, if push button 70 is one of the directional push buttons 41–44 described above in conjunction with FIG. 1, the engine control unit 74 could interrogate line 78 to determine the position of lever 14 and then use the signal on line 76 accordingly. For example, if lever 14 is in neutral gear position, the direction buttons 41–44 would be interpreted as docking mode commands to control a docking system. Alternatively, if lever 14 is in either forward gear or reverse gear, the four directional buttons 41–44 would be interpreted as commands to adjust the trim tabs of the marine vessel. In this circumstance, direction button 41 would be a command to change the trim tabs to lower the bow of the boat, direction button 42 would be interpreted as a command to raise the bow, direction button 43 would be interpreted as a command to lower the port side of the boat, and direction button 44 would be interpreted as a command to lower the starboard side of the boat. The manual select button 48 described above in conjunction with FIG. 1, would be interpreted as an override command that would allow the operator to use the four direction buttons 41–44 to change displays on a LCD device.

With continued reference to FIG. 4, it can be seen that the engine control unit 74 could either provide a command on line 80 to some control device 82, such as the trim tabs of the marine vessel, or provide a command on line 84 to an LCD monitor 86 to change the display or screen. As a result, the signal received on line 76 from one of the push buttons associated with the throttle control mechanism is interpreted as a command which is selected as a function of the status of a parameter determined by a signal on line 78. Therefore, the same button or buttons that are interpreted to be one type of command in one situation can be interpreted to be another type of command in another situation.

Figure 5:
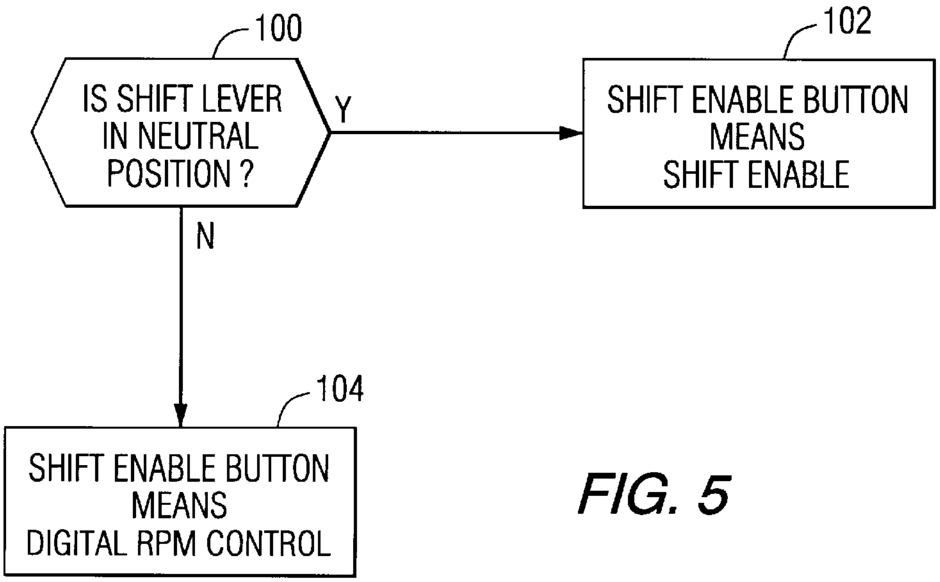
FIG. 5 shows a control scheme relating to a shift lever and shift enable buttons.

The microprocessor, such as that of the engine control unit 74, or any other control unit on the marine vessel, first determines the state of a first operating parameter, such as the gear selection. With reference to FIG. 5, this is represented by the decision block 100 in which the control unit determines whether or not the shift lever is in a neutral position. The position of the gear selector, in this particular example, is the first operating parameter described above. A first sensor, which can be a switch within the base portion 10 or one in the marine propulsion unit, determines the state of the first operating parameter (i.e. in neutral position or in gear) and provides a first signal, such as that on line 78 in FIG. 4, to the control unit. The first state or second state, respectively, in this example would be the neutral position or the gear selection position (i.e. either forward or reverse). If the shift lever is in neutral position, the control unit interprets the shift enable button, 32 or 34, to represent a shift enable command. This is the normal and expected use for the shift enable button. However, if the shift lever is not in neutral position, block 104 is implemented and the shift enable button is interpreted to mean that its state represents an incremental digital RPM control command. In other words, if the associated lever is in gear and the shift enable switch is activated by the operator, the RPM will be increased by a preselected increment. This allows the operator to make fine adjustments to the vessel speed when it is operating in gear. FIG. 5 represents a simple example relating to buttons 32 and 34 in FIG. 1 and the position of the associated lever, 14 or 20. When the shift lever is in neutral position, the status of the button is used as a shift enable signal, as represented by block 102 in FIG. 5. If the shift lever is in gear, the same button is used to control digital RPM changes incrementally. Therefore, the single button, 32 or 34, has dual functions based on the state of a first operating parameter (i.e. the status of the gear selector).

Figure 6:
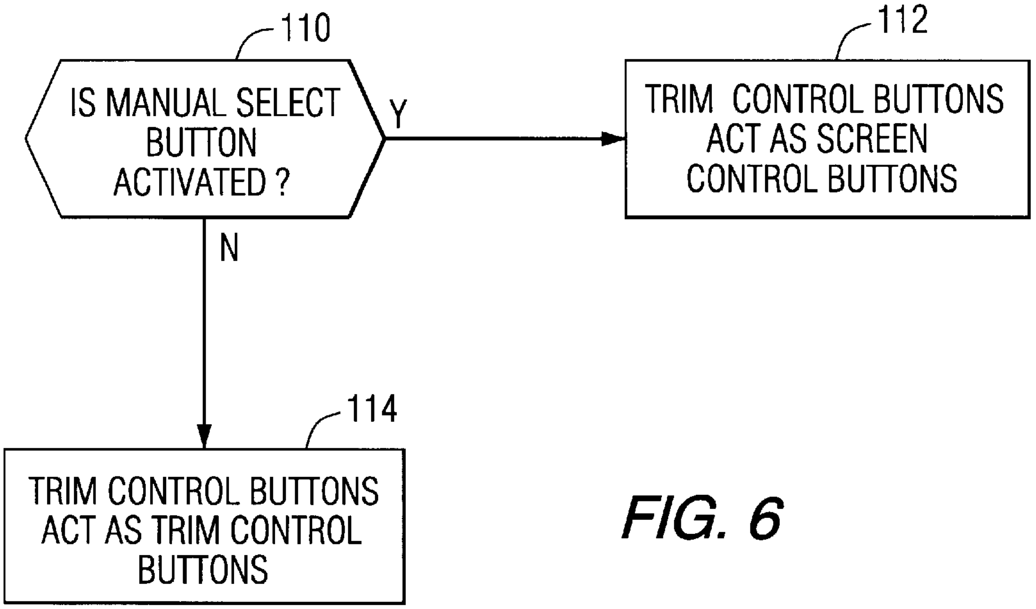
FIG. 6 is a control scheme relating to a manual selector button and trim control buttons.

FIG. 6 represents another example of how the present invention can be implemented. With reference to the manual select button 48 shown in FIG. 1, decision block 110 determines whether or not the manual select is activated. If it is, the trim control buttons, or direction buttons 41–44, are used as screen control buttons for the LCD as described in functional block 112. If the manual select button 48 is not activated, the trim control buttons or direction buttons 41–44, act as trim control buttons as described in functional block 114. Therefore, the four direction buttons 41–44 are provided with dual functions based on the state of a parameter, such as the status of the manual select button 48 being activated or deactivated.

Figure 7:
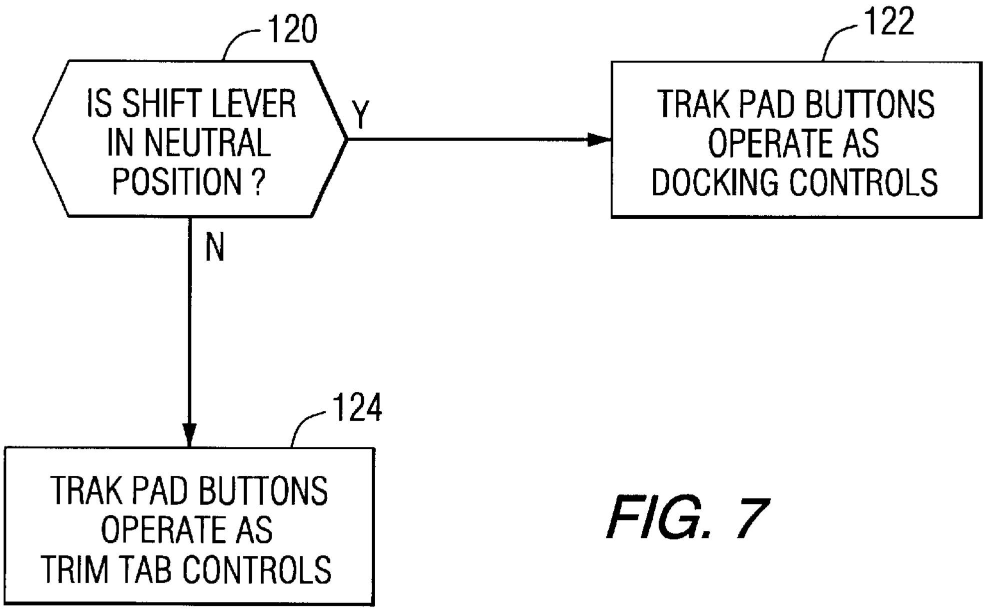
FIG. 7 represents a simplified control scheme relating to a shift lever and track pad buttons.

FIG. 7 shows another example of how a parameter can be monitored to determine the intended command represented by the state of a switch. The control unit 74 interrogates the position of the shift lever 14 to determine if it is in neutral position. If it is, the track pad buttons, or direction buttons 41–44, are interpreted as being docking controls and each of the direction buttons 41–44 is provided with a particular meaning. These meanings can be "move vessel directly toward port", "move vessel directly toward starboard", "rotate vessel clockwise about its center of gravity", or, "rotate vessel counterclockwise about its center of gravity". The precise meaning associated with each of the four direction buttons 41–44 is not limiting to the present invention. If the shift lever is not in neutral position, functional block 124 is executed and the track pad buttons, or direction buttons 41–44, are used as commands for the trim tab control system. These commands were described above.

In order to make the throttle control mechanism of the present invention easy for marine vessel operators to become accustomed to, operation of the present invention is very similar to existing mechanical controls. However, in addition to the standard shift and throttle functions, there are many new features provided. For example, the directional keypad, which includes the four direction buttons 41–44 and the manual select button 48, is used for the alternative purposes of controlling the shift and throttle when in docking mode, controlling the trim tabs of the marine vessel, or manipulating the liquid crystal display (LCD) that is used in conjunction with a customer helm interface system. Switching between the trim tab function and the docking control function is done automatically, depending on the position of the levers, 14 and 20, or gear selectors of the marine propulsion device as described above in conjunction with FIGS. 1–3. With both levers in their neutral positions and the marine vessel speed below 8 miles per hour, the control system defaults to the docking mode. In this mode, the docking LED 64 is energized and the keypad direction buttons 41–44 are used to control the engine shift and throttle functions. For example, when in the docking mode, the direction buttons 41–44 are used to command the functions described below in Table I.

TABLE I

| Button | Function | Result |
|---|---|---|
| Up arrow | Both engines forward | Boat moves forward |
| Down arrow | Both engines reverse | Boat moves backwards |
| Right arrow | Stbd eng. Reverse Port eng. Forward | Bow moves right |
| Left arrow | Stbd eng. Forward, Port eng. Reverse | Bow moves left |

The throttle is controlled by the length of time that each of the direction buttons 41–44 are depressed. Engine speed will increase at a constant rate as the buttons are depressed. The length of time that any particular button is depressed will result in a corresponding higher engine speed. Releasing the button will result in both engines returning to neutral gear position and idle speed.

When in the trim tab control mode, one or both levers, 14 or 20, must be out of its neutral gear position. This causes the keypad control direction buttons, 41–44 to default to the trim tab control mode. The docking LED 64 is de-energized and the directional keypad controls pitch and list according to Table II shown below.

TABLE II

| Button | Function | Result |
|---|---|---|
| Up arrow | Both tabs down | Bow moves down |
| Down arrow | Both tabs up | Stern moves down |
| Right arrow | Stbd tab up, Port tab down | Boat lists right (stbd down) |
| Left arrow | Stbd tab down, Port tab up | Boat lists left (port down) |

On marine vessels that are equipped with the appropriate capability, the keypad buttons 41–44 can be used to control an LCD display by depressing the manual select button 48 for two seconds. This causes the keypad buttons 41–44 to be used to move the cursor on a LCD display panel. In this mode, the manual select button 48 is used as an "ENTER" button. Pressing and holding the select button for two seconds then returns the keypad to the trim tab control and docking mode control configuration. When in the LCD control mode, the keypad switches perform the functions shown below in Table III.

TABLE III

| Button | Function | Result |
|---|---|---|
| Up arrow | Curcor up | Moves cursor up |
| Down arrow | Cursor dn | Moves cursor down |
| Right arrow | Cursor right | Moves cursor right |

TABLE III-continued

| Button | Function | Result |
|---|---|---|
| Left arrow | Cursor left | Moves cursor left |
| Select | Enter | Enter |

The keypad direction buttons 41–44 may also be used to control trim tabs while the engines are in neutral gear position. This is done by depressing the manual select button 48 until the docking LED 64 is de-energized. This changes the control from docking mode to trim tab mode even though the gear selecting levers, 14 and 20 are in neutral gear position. The direction buttons 41–44 may then be used to control the trim tabs. On marine vessels equipped with a LCD display, depressing the manual select button 48 will change the control to LCD mode and then default to the trim tab display on the LCD. When the trim tab screen is displayed, the docking LED 64 will be de-energized and the control system will be in the trim tab mode while the gear selection levers, 14 and 20 are in neutral gear position. The keypad may then be used to control the trim tabs.

If the marine vessel is provided with multiple helm stations, the manual select button 48 can be used to change control from one helm position to another.

The engine trim angle maybe changed using the power trim rocker switches, 24, 26, and 28, on the port control lever 14. The trim switches have the functions identified below in Table IV.

TABLE IV

| Button | Function | Result |
|---|---|---|
| Up arrow-port | Port engine/drive trims up | Boat lists right |
| Down arrow-port | Port-engine/drive trims down | Boat lists left |
| Up arrow-stbd | Stbd engine/drive trims up | Boat lists left |
| Down arrow-port | Stbd engine/drive trims down | Boat lists right |
| Up arrow-center | Both engines/drives trim up | Bow moves up |
| Down arrow-center | Both engines/drives trim down | Bow moves down |

Depressing either of the two neutral lockout or shift enable buttons, 32 and 34, located on the underside of handles 30 and 36, as described above in conjunction with FIG. 1, allows one or both engines to be shifted from neutral into either forward or reverse gears. If the handles are moved without pressing the neutral lockout switch, the neutral LED's, 50 and 52, will be intermittently energized to flash a signal to the operator and the throttle control mechanism of the present invention will be automatically placed in a throttle control only mode. When in this mode, the engines will not shift, but the engine speed can be raised to a threshold of 3,000 RPM. When moving the control levers from either forward gear or reverse gear into the neutral gear position, there is a preselected period of time that shift control is still maintained in an active state. This allows the vessel operator to dock the boat without pressing the neutral switches. During this preselected period of time, the docking LED 64 is energized. The preselected time period is reset each time either engine is moved out of either forward or reverse gear into the neutral gear position. When the preselected time period expires, the neutral switches, 32 and 34, must once again be used in order to place the corresponding lever, 14 or 20, back into either forward or reverse gear. When the preselected timeout has occurred, the docking LED 64 is de-energized.

As described above in conjunction with FIG. 1, four LED's are provided on the base portion 10 of the throttle control mechanism. The neutral LED's, 50 and 52, are energized when the engines are in neutral gear position. Gear position can be determined by sensing the position of the shift actuator on the associated engine and not necessarily by the position of the associated lever, 14 or 20. The LED 52 nearest the starboard handle 20 indicates the neutral gear position for the starboard engine and the LED 50 nearest the port handle 14 indicates the neutral gear position for the port engine. The station active LED 60 indicates which throttle control mechanism at which helm is active if more than one helm is provided on the marine vessel. Active control may be changed from one throttle control mechanism to another by pressing the manual select button 48 and then adjusting the levers, 14 and 20, to be generally equal to each other in position. The docking LED 64 indicates when the control system is in docking mode. In the docking mode, thrust may be controlled from the directional keypad buttons 41–44. This LED also indicates that shifting may occur by using the control handles without depressing the neutral switches.

As can by seen by the description above, the present invention allows dual functions to be performed by certain switches or push buttons on the throttle control mechanism. It accomplishes this function by first sensing the state of a first operating parameter. The operating parameter can be the gear position of the levers, 14 or 20, or the status of the manual select button 48, or any other monitored parameter relating to the marine vessel. The present invention also detects the status of a switch, such as any of the direction buttons 41–44, and interprets the intended command represented by a signal from that switch in a manner that depends on the state of the first operating parameter. For example, when the first operating parameter indicates that the gear selector of the engine is in neutral position, the depressed switch is interpreted in one way. If the operating parameter indicates that the gear selector is in either forward or reverse gear, the same button is interpreted differently. This allows dual functionality to be accomplished for certain preselected buttons on the throttle control mechanism.

As can be seen, the present invention provides an efficient way to utilize buttons on the throttle control mechanism for dual purposes which serves two important functions. First, it reduces the total number of switches and buttons required for these purposes. Secondly, it allows the operator to use buttons that are easily within reach on the throttle control mechanism console for several different purposes, including controlling the display screens on a liquid crystal display device.

Although the present invention has been described with particular detail and illustrated to show several preferred embodiments, it should be understood that alternative embodiments are also within its scope.

I claim:

1. A throttle control mechanism for a marine vessel, comprising:

a base portion attached to said marine vessel;

a manually movable lever movably attached to said base portion for movement relative to said base portion;

a control unit connected in signal communication with said throttle control mechanism, said control unit being connected in signal communication with a manual override switch which provides a first signal to said control unit, said first signal being in a first state or a second state; and at least one switch attached to said throttle control mechanism and connected in signal communication with said control unit, the status of said at least one switch being interpreted as a trim system control command when said first signal is in said first state and as a operator visual display command when said first operating parameter is in said second state.

2. The control mechanism of claim 1, further comprising:

a neutral gear position sensor which provides a second signal to said control unit which is representative of a position of said manually movable lever being in a third state or a fourth state; and another switch attached to said throttle control mechanism and connected in signal communication with said control unit, the status of said another switch being interpreted as a docking system control command when said first operating parameter is in said third state and as trim system control command when said first operating parameter is in said fourth state.

3. The control mechanism of claim 1, wherein:

said first manually movable lever is pivotable relative to said base portion.

4. The control mechanism of claim 1, further comprising:

a second manually movable lever movably attached to said base portion for movement relative to said base portion.

5. The control mechanism of claim 1, wherein:

said control unit is an engine control unit.

6. A throttle control mechanism for a marine vessel, comprising:

a base portion attached to said marine vessel;

a throttle control lever movably attached to said base portion for movement relative to said base portion;

a control unit connected in signal communication with said throttle control mechanism, said control unit being connected in signal communication with a neutral gear position sensor which provides a first signal to said control unit which is representative of a position of said throttle control lever of said marine vessel being in a first state or a second state;

at least one switch attached to said throttle control mechanism and connected in signal communication with said control unit, the status of said at least one switch being interpreted as a trim tab control command when said position of said throttle control lever is in said first state and as a docking system control command when said position of said throttle control lever is in said second state, said first manually movable lever being pivotable relative to said base portion;

a manual override switch which provides a second signal to said control unit which is representative of a manually selected mode of said marine vessel being in a third state or a fourth state; and another switch attached to said throttle control mechanism and connected in signal communication with said control unit, the status of said another switch being interpreted as a trim system control command when said manually selected mode is in said third state and as a operator visual display command when said manually selected mode is in said fourth state.

7. The control mechanism of claim 6, further comprising:

a second manually movable lever movably attached to said base portion for movement relative to said base portion.

8. A throttle control mechanism for a marine vessel, comprising:

a base portion attached to said marine vessel;

a manually movable lever movably attached to said base portion for movement relative to said base portion;

a control unit connected in signal communication with said throttle control mechanism, said control unit being connected in signal communication with a neutral gear position sensor which provides a first signal to said control unit which is representative of a position of said manually movable lever of said marine vessel, said first signal being in a first state or a second state; and at least one switch attached to said throttle control mechanism and connected in signal communication with said control unit, the status of said at least one switch being interpreted as a docking system control command when said first signal is in said first state and as a trim system control command when said first operating parameter is in said second state.

9. The control mechanism of claim 8, further comprising:

a manual override switch which provides a second signal to said control unit, said second signal being representative of a manually selected mode being in a third state or a fourth state; and another switch attached to said throttle control mechanism and connected in signal communication with said control unit, the status of said another switch being interpreted as a trim system control command when said first operating parameter is in said third state and as an operator visual display command when said first operating parameter is in said fourth state.

* * * * *